United States Patent
Flender et al.

(10) Patent No.: US 10,759,011 B2
(45) Date of Patent: Sep. 1, 2020

(54) METHOD FOR INSTALLING AN ADJUSTABLE CAMSHAFT AND INSTALLATION DEVICE

(71) Applicant: Mahle International GmbH, Stuttgart (DE)

(72) Inventors: Thomas Flender, Eberdingen (DE); Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 170 days.

(21) Appl. No.: 15/920,408

(22) Filed: Mar. 13, 2018

(65) Prior Publication Data
US 2018/0264605 A1    Sep. 20, 2018

(30) Foreign Application Priority Data

Mar. 14, 2017   (DE) ........................ 10 2017 204 234

(51) Int. Cl.
| | |
|---|---|
| *F01L 1/047* | (2006.01) |
| *B23P 19/10* | (2006.01) |
| *F16B 17/00* | (2006.01) |
| *F16H 53/02* | (2006.01) |
| *B23P 19/04* | (2006.01) |

(Continued)

(52) U.S. Cl.
CPC .............. *B23P 19/10* (2013.01); *B23P 19/04* (2013.01); *F01L 1/047* (2013.01); *F16B 17/004* (2013.01); *F16H 53/025* (2013.01); *B23P 2700/02* (2013.01); *F01L 2001/0473* (2013.01);
(Continued)

(58) Field of Classification Search
CPC ......... Y10T 29/49293; Y10T 29/49895; Y10T 29/49899; Y10T 29/49902; Y10T 29/53913; Y10T 29/49826; F01L 2001/0473; F16H 53/025; F16H 53/04
See application file for complete search history.

(56) References Cited

U.S. PATENT DOCUMENTS

2013/0185909 A1* 7/2013 Ardisana, II ............ B25B 5/147
29/407.09

FOREIGN PATENT DOCUMENTS

| | | |
|---|---|---|
| DE | 102013211161 A1 | 12/2014 |
| DE | 102014109752 A1 | 1/2016 |

OTHER PUBLICATIONS

English translation DE2013211161A1 (Year: 2014).*
(Continued)

*Primary Examiner* — Jason L Vaughan
*Assistant Examiner* — Amanda Kreiling
(74) *Attorney, Agent, or Firm* — Fishman Stewart PLLC

(57) ABSTRACT

A method for installing an adjustable camshaft may include inserting an adjustable camshaft in an installation device. The camshaft may include an outer shaft surrounding an inner shaft. The installation device may enable alignment of at least one cam rotatably mounted on the outer shaft. The method may include aligning the at least one cam by pushing an alignment pin through a radial passthrough opening in the at least one cam and through a drillhole in the inner shaft congruent therewith. The method may include non-rotatably connecting the at least one cam to the inner shaft by pushing a connecting pin into the passthrough opening and the drillhole in a direction opposite a direction the alignment pin was pushed. Non-rotatably connecting the at least one cam to the inner shaft may include detachably coupling the connecting pin and the alignment pin in a positive locking manner.

16 Claims, 2 Drawing Sheets

(51) Int. Cl.
 F16B 19/02 (2006.01)
 F16H 53/04 (2006.01)
(52) U.S. Cl.
 CPC ....... *F01L 2103/00* (2013.01); *F01L 2103/01* (2013.01); *F16B 19/02* (2013.01); *F16H 53/04* (2013.01)

(56) References Cited

OTHER PUBLICATIONS

English abstract for DE-102014109752.
English abstract for DE-102013211161.
German Search Report for DE102017204234.6, dated Aug. 7, 2018.

* cited by examiner

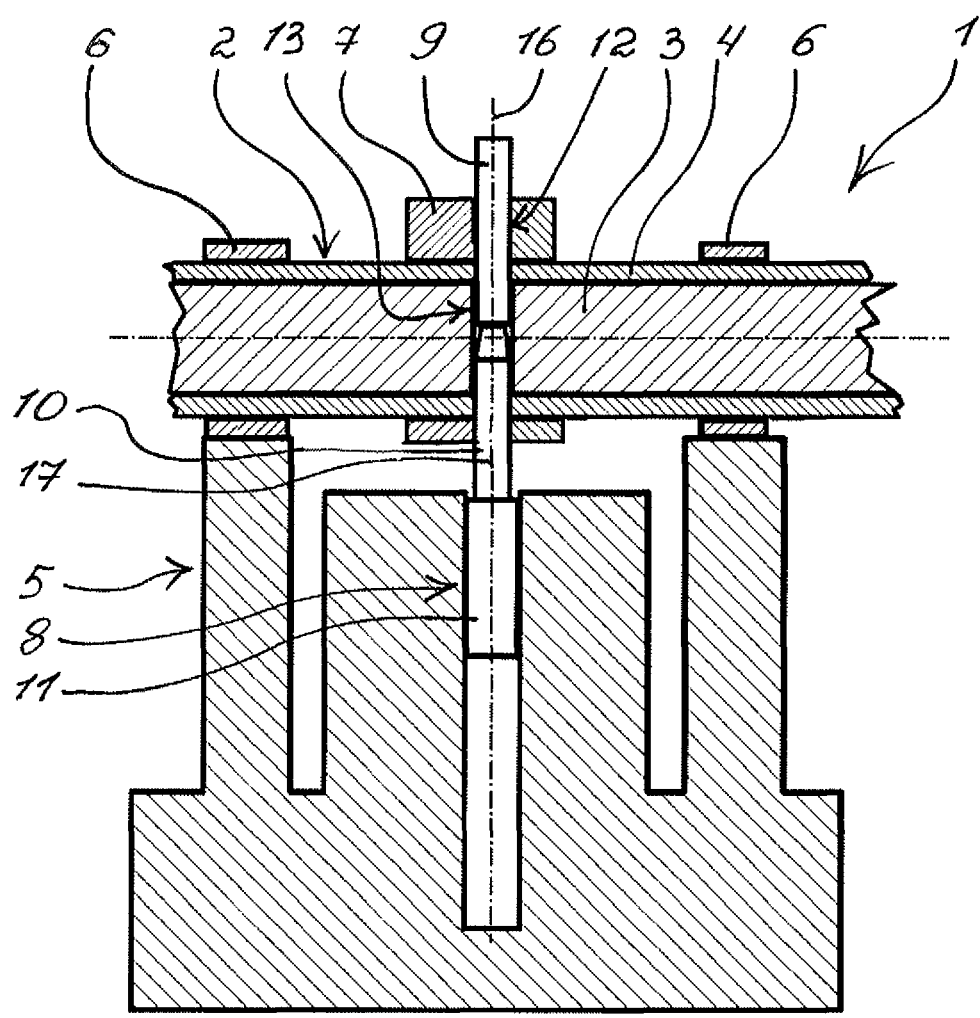
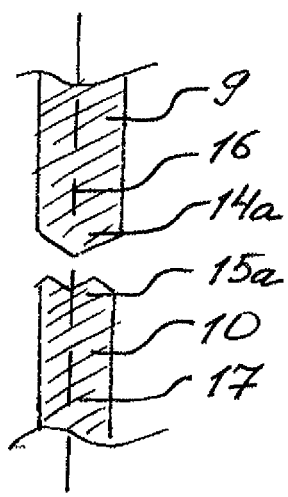
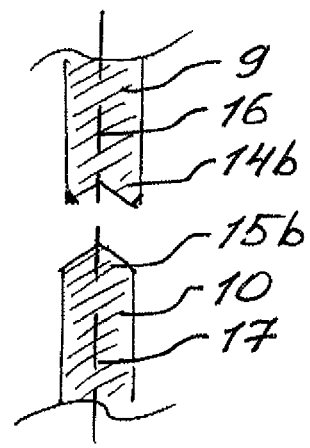
Fig. 1
Fig. 2
Fig. 3

METHOD FOR INSTALLING AN ADJUSTABLE CAMSHAFT AND INSTALLATION DEVICE

CROSS-REFERENCE TO RELATED APPLICATIONS

This application claims priority to German Patent Application No. DE 10 2017 204 234.6, filed on Mar. 14, 2017, the contents of which are hereby incorporated by reference in its entirety.

TECHNICAL FIELD

The invention relates to a method for installing an adjustable camshaft and an installation device.

BACKGROUND

Adjustable camshafts are known from the prior art. An adjustable camshaft has an inner shaft and an outer shaft, wherein the outer shaft surrounds the inner shaft in the manner of a tube. The camshaft is furnished with at least one cam, which is fixed rotatably on the outer shaft and non-rotatably on the inner shaft.

The fixing of the cam on the inner shaft may be carried out for example by pinning. For this, the adjustable camshaft is mounted on an installation device in such manner that a radial opening in the cam and an opposite opening on the inner shaft are aligned with each other by a pilot pin placed in the openings. Then, a dowel pin is inserted through the two openings in the opposite direction to the pilot pin, thus pushing the pilot pin out of the openings. As soon as the dowel pin has replaced the pilot pin in the openings, the cam is fixed in non-rotating manner on the inner shaft and the adjustable camshaft can be removed from the installation device.

In order to prevent the pilot pin from becoming misaligned in the openings when the cam is being fixed on the inner shaft, movement of the pilot pin in the openings may be assisted with a spring, for example. However, this has the effect of increasing the manufacturing costs of the installation device and still does not prevent the dowel pin from being misaligned.

SUMMARY

The problem addressed by the invention is therefore to provide a method and an installation device with which misalignment of the dowel pin and the pilot pin may advantageously be prevented and alignment of the cam on the adjustable camshaft simplified.

This problem is solved according to the invention with the object of the independent claim(s). Advantageous variants are the subject matter of the dependent claim(s).

The present invention is based on the general idea of first developing a method by which the aforementioned drawbacks are avoided. A method for installing an adjustable camshaft having an inner shaft and with an outer shaft which surrounds the inner shaft in the manner of a tube comprises an insertion step, an alignment step and a connection step. In the insertion step the camshaft is inserted in an installation device, wherein the installation device enables alignment of at least one cam mounted rotatably on the outer shaft relative to the inner shaft. In the following alignment step, an alignment pin is pushed through a radial passthrough opening in the cam and through a drillhole/opening in the inner shaft which is aligned therewith, so that the cam is aligned relative to the inner shaft. In the connection step, a connecting pin is pushed though the passthrough opening and the drillhole in the opposite direction to the alignment pin. This causes the alignment pin to be pushed out, and the cam is connected non-rotatably with the inner shaft. According to the invention, in the connection step the connecting pin and the alignment pin are connected to each other detachably in positive locking manner.

Thus, in the connection step the connecting pin and the alignment pin are attached to each other detachably in positive locking manner, and after the connection step they are easily separated from each other. With a releasable, positive locking attachment of the connecting pin and the alignment pin to each other, it is advantageously possible to avoid radial buckling at the contact point between the alignment pin and the connecting pin, and thus also misalignment of the alignment pin and connecting pin in the passthrough opening and the drillhole, particularly in a tubular inner shaft. This enables the method to be carried out easily and with less effort.

In a further development of the solution according to the invention, it is advantageously provided that a conical connecting pin tip of the connecting pin and an alignment pin tip of the alignment pin which is designed to match or complement the connecting pin tip engage with each other. Alternatively, it is provided that a conical alignment pin tip of the alignment pin and a connecting pin tip of the connecting pin which is designed to match or complement the alignment pin tip engage with each other.

The conical connecting pin tip or the alignment pin tip and the alignment pin tip or connecting pin tip with matching or complementary design enable the longitudinal axes of the connecting pin and the alignment pin to be aligned with each other. This prevents a radial displacement or buckling of the connecting pin and the alignment pin relative to each other, and advantageously prevents them from being misaligned in the passthrough opening and the drillhole.

The invention also relates to an installation device for installing the adjustable camshaft with the inner shaft and with the outer shaft surrounding the inner shaft in the manner of a tube and for aligning at least one cam arranged on the outer shaft so as to be rotatable relative to the inner shaft. The installation device is also equipped with an attachment assembly for retaining the camshaft on the installation device and an alignment assembly. The alignment assembly includes at least one alignment pin and at least one connecting pin for aligning the cam on the camshaft. According to the invention, the installation device is designed to perform the method described above.

Thus, according to the invention the connecting pin and the alignment pin may be attached to one another or engage in one another in positive locking manner, with the result that the installation device according to the invention advantageously serves to prevent the connecting pin and the alignment pin from becoming misaligned in the camshaft. The positive locking connection may be created and released easily, thus simplifying the method performed with the installation device.

In an advantageously further development of the installation device according to the invention, it is provided that the connecting pin has a conical connecting pin tip and the alignment pin has an alignment pin tip designed to match or complement the connecting pin tip. Alternatively, it is provided that the alignment pin has a conical alignment pin tip and the connecting pin has an connecting pin tip designed to match or complement said alignment pin tip. With such a design of the connecting pin tip and the alignment pin tip, longitudinal axes of the connecting pin and the alignment pin are aligned with each other. The connecting pin tip and the alignment pin tip are attached in positive locking manner advantageously preventing a radial displacement or buckling of the connecting pin and the alignment pin relative to each other. This in turn advantageously prevents them from being misaligned in the passthrough opening of the cam and in the drillhole in the inner shaft, and simplified the method that is carried out with the installation device.

Further important features and advantages are described in the dependent claims, the drawing and the associated description of the figures with reference to the drawing.

Of course, the features described in the preceding text, and those which will be explained below are usable not only in the combination described in each case, but also in other combinations or on their own without departing from the scope of the present invention.

Preferred embodiments of the invention are represented in the drawing and are explained in greater detail in the following description, in wherein identical reference signs refer to identical or similar or functionally equivalent components.

BRIEF DESCRIPTION OF THE DRAWINGS

In the schematic drawing:

FIG. 1 shows a cross-sectional view through an installation device according to the invention;

FIG. 2 shows a cross-sectional view of an alignment pin and a connecting pin;

FIG. 3 shows a cross-sectional view of an alignment pin and a connecting pin with an alternative design;

DETAILED DESCRIPTION

Figure 4:
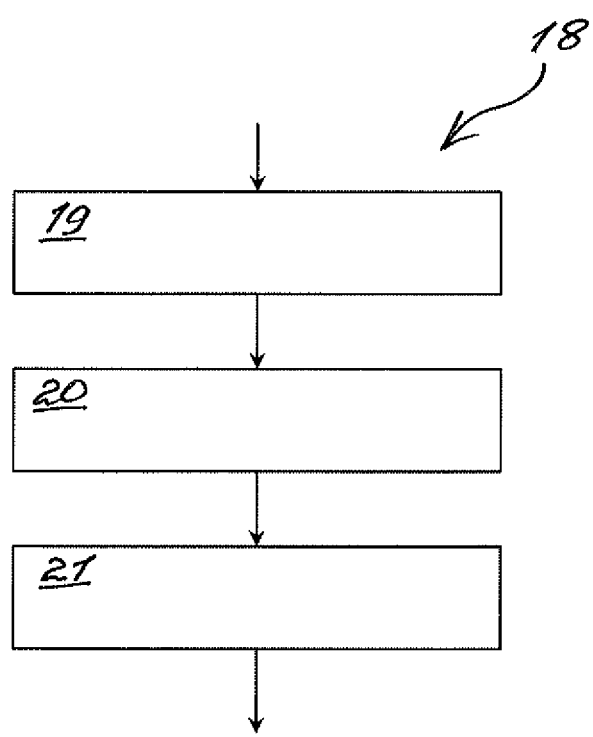
FIG. 4 represents individual method steps of a method according to the invention for installing a camshaft.

FIG. 1 shows a cross-sectional view through an installation device 1 according to the invention. To effect the installation, an adjustable camshaft 2 having an inner shaft 3 and having an outer shaft 4 that surrounds inner shaft 3 in the manner of tube and is arranged coaxially therewith is attached to installation device 1. For this purpose, installation device 1 has an attachment assembly 5 with attachment elements 6, by which camshaft 2 may be attached to installation device 1 and aligned radially therewith.

The camshaft 2 attached to installation device 1 has a cam 7 which may be attached to inner shaft 3 non-rotatably with installation device 1. For this purpose, installation device 1 includes an alignment assembly 8 with a connecting pin 9 and with an alignment pin 10, wherein alignment pin 10 is mounted so as to be displaceable radially relative to camshaft 3 by a guide assembly 11. In this way, alignment pin 10 may be arranged in a passthrough opening 12 of cam 7 and in a drillhole 13 in inner shaft 3 congruent therewith, thus enabling cam 7 to be aligned with inner shaft 3. Connecting pin 9 may then be pushed into passthrough opening 12 in the opposite direction to alignment pin 10 and into drillhole 13, thus pushing alignment pin 10 out.

According to the invention, connecting pin 9 and alignment pin 10 are connected detachably to each other in positive locking manner, so that a misalignment between connecting pin 9 and alignment pin 10 in passthrough opening 12 and in drillhole 13 may advantageously be prevented.

In FIG. 1, the detachable, positive locking connection between connecting pin 9 and alignment pin 10 is indicated by a dashed line.

FIG. 2 shows a cross sectional view of connecting pin 9 and alignment pin 10. Connecting pin 9 has a conical connecting pin tip 14a and alignment pin 10 has an alignment pin tip 15a designed to complement connecting pin tip 14a. FIG. 3 shows an alternative configuration of connecting pin 9 and alignment pin 10. In this case, alignment pin 10 has a conical alignment pin tip 15b and connecting pin 9 has a connecting pin tip 14b designed to complement alignment pin tip 15b.

Together, connecting pin tip 14a or 14b and the alignment pin tip 15a or 15b designed to complement it serve to align the longitudinal axes 16 and 17 of connecting pin 9 and alignment pin 10 relative to each other and prevent a radial displacement and buckling of connecting pin 9 and alignment pin 10 relative to each other. In this way, a misalignment of connecting pin 9 and alignment pin 10 in the passthrough opening 12 of cam 7 and in drillhole 13 of inner shaft 3 may advantageously be prevented.

FIG. 4 shows a diagrammatic view of a method 18 according to the invention 18 with an insertion step 19, with an alignment step 20 and with a connection step 21. In insertion step 19, camshaft 2 is inserted in installation device 1. In the subsequent alignment step 20 alignment pin 10 is pushed through radial passthrough opening 12 in cam 7 and through the drillhole 13 in inner shaft 2 congruent therewith, thus aligning cam 7 relative to inner shaft 3. In connection step 21, connecting pin 9 is pushed into passthrough opening 12 and drillhole 13 in the opposite direction to alignment pin 10, thus pushing alignment pin 10 out of passthrough opening 12 and out of drillhole 13.

In connection step 21, according to the invention connecting pin 9 is attached detachably and in positive locking manner to alignment pin 10. In this way, radial buckling of connecting pin 9 and alignment pin 10 and thus also misalignment of connecting pin 9 and alignment pin 10 in passthrough opening 12 and in drillhole 13 may advantageously be prevented.

The invention claimed is:

1. A method for installing an adjustable camshaft, comprising:
   inserting an adjustable camshaft in an installation device, the adjustable camshaft including an outer shaft surrounding an inner shaft in a tubular manner, the installation device enabling alignment of at least one cam rotatably mounted on the outer shaft relative to the inner shaft;
   aligning the at least one cam relative to the inner shaft by pushing an alignment pin through a radial passthrough opening in the at least one cam and through a drillhole in the inner shaft congruent therewith; and
   non-rotatably connecting the at least one cam to the inner shaft by pushing a connecting pin into the passthrough opening and the drillhole in a direction opposite a direction the alignment pin was pushed, the connecting pin pushing the alignment pin out of the cam;
   wherein non-rotatably connecting the at least one cam to the inner shaft includes detachably coupling the connecting pin and the alignment pin in a positive locking manner.

2. The method according to claim 1, wherein coupling the connecting pin and the alignment pin includes engaging a conical connecting pin tip of the connecting pin and an alignment pin tip of the alignment pin, the alignment pin tip structured complementary to the connecting pin tip.

3. The method according to claim 2, wherein engaging the conical connecting pin tip of the connecting pin and the alignment pin tip of the alignment pin includes inserting the conical connecting pin tip into a complimentarily structured receptacle of the alignment pin tip such that radial movement of the connecting pin and the alignment pin relative to one another is restricted.

4. The method according to claim 1, wherein coupling the connecting pin and the alignment pin includes engaging a conical alignment pin tip of the alignment pin and a connecting pin tip of the connecting pin, the connecting pin tip structured complementary to the alignment pin tip.

5. The method according to claim 4, wherein engaging the conical alignment pin tip of the alignment pin and the connecting pin tip of the connecting pin includes inserting the conical alignment pin tip into a complimentarily structured receptacle of the connecting pin tip such that radial movement of the connecting pin and the alignment pin relative to one another is restricted.

6. The method according to claim 1, wherein coupling the connecting pin and the alignment pin includes axially aligning the connecting pin and the alignment pin.

7. The method according to claim 1, wherein coupling the connecting pin and the alignment pin includes inserting one of a connecting pin tip of the connecting pin and an alignment pin tip of the alignment pin into the other of the connecting pin tip and the alignment pin tip.

8. The method according to claim 1, wherein non-rotatably connecting the at least one cam to the inner shaft further includes restricting radial movement of the connecting pin and the alignment pin relative to one another via the detachable coupling of the connecting pin and the alignment pin.

9. An installation device for installing an adjustable camshaft including an inner shaft including a drillhole, an outer shaft surrounding the inner shaft in a tubular manner, and at least one cam including a radial passthrough opening arranged on the outer shaft such that the at least one cam is rotatable relative to the inner shaft, the installation device comprising:
an attachment assembly configured to retain the camshaft; and
an alignment assembly configured to align the at least one cam, the alignment assembly including at least one alignment pin and at least one connecting pin, the at least one alignment pin and the at least one connecting pin configured to be insertable in the passthrough opening and the drillhole;
wherein inserting the at least one alignment pin within both the passthrough opening and the drillhole aligns the at least one cam;
wherein inserting the at least one connecting pin within both the passthrough opening and the drillhole in a direction opposite the at least one alignment pin when the at least one cam is aligned pushes the at least one alignment pin out of the passthrough opening and the drillhole and non-rotatably connects the at least one cam to the inner shaft; and
wherein the at least one connecting pin and the at least one alignment pin are detachably coupled in a positive locking manner when the at least one connecting pin is inserted within the passthrough opening and the drillhole when the at least one cam is aligned.

10. The installation device according to claim 9, wherein the at least one connecting pin includes a conical connecting pin tip, and wherein the at least one alignment pin includes an alignment pin tip structured complementary to the connecting pin tip.

11. The installation device according to claim 10, wherein the alignment pin tip includes a receptacle structured complementary to the conical connecting pin tip.

12. The installation device according to claim 9, wherein the at least one alignment pin includes a conical alignment pin tip, and wherein the at least one connecting pin includes a connecting pin tip structured complementary to the alignment pin tip.

13. The installation device according to claim 12, wherein the connecting pin tip includes a receptacle structured complementary to the conical alignment pin tip.

14. The installation device according to claim 9, further comprising a guide assembly, wherein the at least one alignment pin is structured and arranged on the alignment assembly such that the at least one alignment pin is displaceable radially relative to the camshaft via the guide assembly.

15. The installation device according to claim 9, wherein:
the at least one alignment pin includes an alignment pin tip;
the at least one connecting pin includes a connecting pin tip structured complementary to the alignment pin tip; and
one of the connecting pin tip and the alignment pin tip is structured to receive and engage the other of the connecting pin tip and the alignment pin tip such that the at least one connecting pin and the at least one alignment pin are detachably coupled in a positive locking manner and axially aligned with one another when engaged.

16. The installation device according to claim 15, wherein, when that at least one connecting pin and the at least one alignment pin are engaged, a surface of the alignment pin tip abuts against a surface of the connecting pin tip restricting radial movement of the at least one alignment pin and the at least one connecting pin relative to one another.

* * * * *